United States Patent [19]
Crawford

[11] Patent Number: 5,956,113
[45] Date of Patent: Sep. 21, 1999

[54] BISTABLE REFLECTIVE DISPLAY AND METHODS OF FORMING THE SAME

[75] Inventor: Greg P. Crawford, Providence, R.I.

[73] Assignee: Xerox Corporation, Stamford, Conn.

[21] Appl. No.: 08/897,210

[22] Filed: Jan. 31, 1997

[51] Int. Cl.$^6$ .................................................. C09K 19/02
[52] U.S. Cl. .......................................... 349/185; 349/186
[58] Field of Search ..................................... 349/185, 186

[56] References Cited

U.S. PATENT DOCUMENTS

| | | | |
|---|---|---|---|
| 5,729,320 | 3/1998 | Eidenschink et al. | 349/166 |
| 5,748,272 | 5/1998 | Tanaka et al. | 349/185 |
| 5,751,452 | 5/1998 | Tanaka et al. | 349/185 |

OTHER PUBLICATIONS

K. Tanaka et al., "Optimization of Holographic PDLC for Reflective Color Display Applications," SID 95 DIGEST, pp. 267–270.

Gregory P. Crawford et al., "Reflective Color Displays for Imaging Applications," Proceedings of the IS&T/SID 1995 Color Imaging Conference: Color Science, Systems and Applications, pp. 52–58.

K. Tanaka et al., "A Liquid–Crystal/Polymer Optical Device Formed by Holography for Reflective Color Display Applications," PDLC–2, pp. 109–111.

M. Date et al., "Three–Primary–Color Holographic Polymer Dispersed Liquid Crystal (HPDLC) Devices for Reflective Displays," Asia Display '95, pp. 603–606.

M. Kreuzer et al., "New Liquid Crystal Display with Bistability and Selective Erasure Using Scattering in Filled Nematics," *Appl. Phys. Lett.* 62 (15), Apr. 12, 1993, pp. 1712–1714.

Gregory P. Crawford and Slobodan Zumer, eds., *Liquid Crystals in Complex Geometries*, 1996: Chapter 5, D.–K. Yang et al., "Polymer–Stabilized Cholesteric Textures," pp. 103–142; Chapter 11, J. L. West, "The Challenge of New Applications to Liquid Crystal Displays," pp. 255–264; Chapter 12, H. Yuan, "Bistable Reflective Cholesteric Displays," pp. 265–280; and Chapter 15, M. Kreuzer et al., Filled Nematics, pp. 307–324.

*Primary Examiner*—William L. Sikes
*Assistant Examiner*—Joanne Kim
*Attorney, Agent, or Firm*—Oliff & Berridge, PLC

[57] ABSTRACT

A bistable reflective display has a stable focal conic or weakly scattering state even when an applied voltage used to transition to the focal conic state is removed. The bistable reflective display includes first and second substrates, a cholesteric liquid crystal material located between the first and second substrates and silica agglomerates dispersed within the cholesteric liquid crystal material.

16 Claims, 7 Drawing Sheets

BISTABLE REFLECTIVE DISPLAY AND METHODS OF FORMING THE SAME

BACKGROUND OF THE INVENTION

1. Field of the Invention

This invention relates to a bistable reflective display and methods of forming the same. In particular, the invention relates to a bistable reflective display using chiral liquid crystal and silica agglomerates and methods of forming the same.

2. Description of Related Art

Several types of reflective liquid crystal displays have recently been developed. Many of these reflective liquid crystal displays utilize liquid crystal-polymer dispersion technologies. Such displays are superior to conventional polarizer based displays for reflective mode operation.

An example of one type of such a reflective liquid crystal display is the polymer-dispersed liquid crystal (PDLC) display, which operates on the principle of electrically controlled light scattering. With this technology, liquid crystal droplets are embedded in a polymer matrix. In the off-state, the alignment of the liquid crystal droplets (symmetry axis) is random, resulting in an opaque, scattering film because of the mismatch between effective refractive index of the liquid crystal with that of the polymer. Upon application of an electric field, the liquid crystal within the liquid crystal droplets aligns parallel to the electric field and the composite material becomes transparent. However, contrast ratios in the direct-view reflective mode are in the 5–10:1 range which are strongly cell thickness dependent. Further, the reflectivity of the polymer dispersed liquid crystal reflective display is only about 12 to 15%.

Another type of reflective liquid crystal display is the polymer dispersed cholesteric liquid crystal display (PDCLC), which operates on the principle of Bragg reflection. Such cholesteric liquid crystal displays have a contrast ratio approaching approximately 10:1 with a photopic reflectivity of 10–13% under ambient lighting conditions and approximately 40% at the Bragg wavelength.

Another type of reflective liquid crystal display is a polymer stabilized cholesteric texture (PSCT) reflective display. The polymer stabilized cholesteric texture reflective display uses a small amount of polymer additive in the cholesteric liquid crystal medium which assembles into a stabilizing network. Contrast ratios have been reported between 20–30:1 with 10 to 15% photopic reflection under ambient lighting conditions, and nearly 40% at the Bragg wavelength. Similar displays have been demonstrated without the polymer with comparable performance.

A recent type of reflective liquid crystal display is a stabilized liquid crystal display formed with nematic phase liquid crystal stabilized by silica agglomerates dispersed within the liquid crystal. Use of the silica agglomerates allows switching the display between a transparent state and a light scattering state both of which are stable without maintaining the voltage (or electric field) used to switch from the transparent to the light scattering state. However, transition from the transparent state to a reflective state requires thermal recycling, with laser addressing or perhaps through the use of ultrasound.

Another recent type of reflective liquid crystal display is the holographic polymer dispersed liquid crystal display. Such a display is reported in "Holographically formed liquid crystal/polymer device for reflective color displays", by Tanaka et al., as reported in the Journal of the Society for Information Display, Volume 2, No. 1, 1994, pages 37–40. Further developments by Tanaka et al. reported on optimization of such a holographic liquid crystal display in "Optimization of Holographic PDLC for Reflective Color Display Applications" in the SID '95 Digest, pages 267–270. This holographically formed polymer dispersed liquid crystal is formed using optical interference techniques to form planes of liquid crystal droplets at predesignated positions within the sample setting up a modulation in the liquid crystal droplet densities. The resulting optical interference reflects the Bragg wavelength in the off-state when the droplets are misaligned. Upon application of an applied voltage, the periodic refractive index modulation vanishes if the refractive index of the liquid crystal is approximately matched with the refractive index of the polymer, and all incident light is transmitted. The spectral reflectance of the display is determined during the fabrication process and can be chosen to reflect any visible wavelength. The above-described holographic liquid crystal/polymer reflective color display is formed with an isotropic polymer which results in liquid crystal droplets being formed during the phase separation. Because the polymer is isotropic, the molecules of the polymer are randomly aligned and the display device has visible opaqueness or haze when viewed from an angle due to the mismatch between the effective refractive index of the liquid crystal and that of the polymer becomes enhanced at wide angles. Additionally, this display device requires a relatively large drive voltage due to the liquid crystal spherical droplets. In particular, the voltage necessary to drive the display device is proportional to the surface-to-volume ratio of the liquid crystal droplets. Such spherical droplets have a surface-to-volume ratio of 3/R where R is the radius of the droplet.

U.S. patent application attorney docket No. JAO 34133, entitled "HOLOGRAPHICALLY FORMED REFLECTIVE DISPLAY, LIQUID CRYSTAL DISPLAY AND PROJECTION SYSTEMS AND METHODS OF FORMING THE SAME", the subject matter of which is incorporated herein, discloses holographically formed reflective displays and projection systems. U.S. patent application Ser. No. 08/792, 269, entitled "BROADBAND REFLECTIVE DISPLAY AND METHODS OF FORMING THE SAME", the subject matter of which is incorporated herein, discloses broadening the reflective wavelengths by including nine or more groups of reflective layers each being reflective of different wavelengths of light.

Accordingly, there is a need to provide a bistable reflective display that has an improved photopic white reflectance, can operate at reduced drive voltages, has a high contrast and has a haze free appearance when viewed from different viewing angles.

SUMMARY OF THE INVENTION

To solve these and other problems, this invention provides a bistable reflective display. The bistable reflective display includes first and second substrates, a cholesteric liquid crystal material located between the first and second substrates and silica agglomerates dispersed within the chiral liquid crystal material.

A more complete understanding of the invention can be obtained by considering the following detailed description, in conjunction with the accompanying drawings, wherein like index numerals indicate like parts.

DETAILED DESCRIPTION OF PREFERRED EMBODIMENTS

Figure 1A:
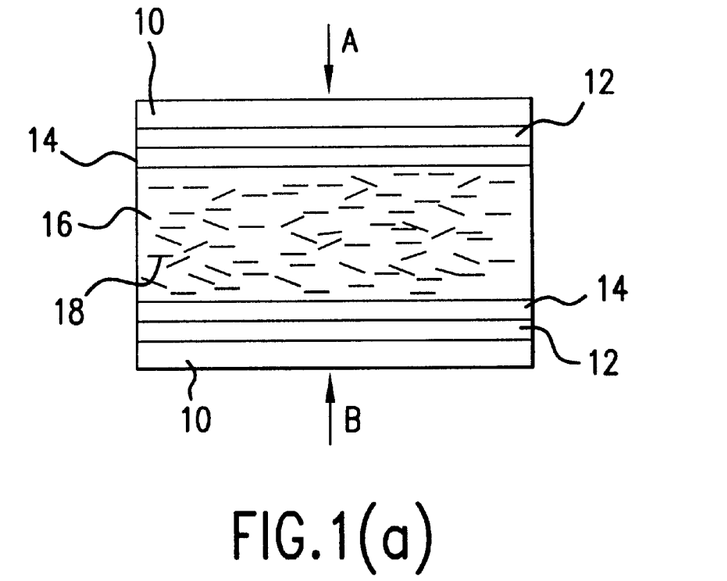
FIG. 1a is a schematic view illustrating a reflective display prior to application of interfering lasers during assembly of the display.

FIG. 1a illustrates a reflective display. Between substrates 10 are formed indium tin oxide layers 12 and alignment layers 14. Alignment layers 14 may be a rubbed polymer layer, where homogeneous surface boundary conditions are desired, or a silane surfactant layer, for example, where homeotropic (perpendicular) surface boundary conditions are desired, as will be further explained below. Displaced between the alignment layers 14 is a anisotropic polymer 18 dissolved in a liquid crystal solvent. The anisotropic polymer 18 may include a photo-active monomer and suitable photo-initiator. The liquid crystal polymer mixture 16 is homogenized via mechanical agitation and heat.

Figure 1B:
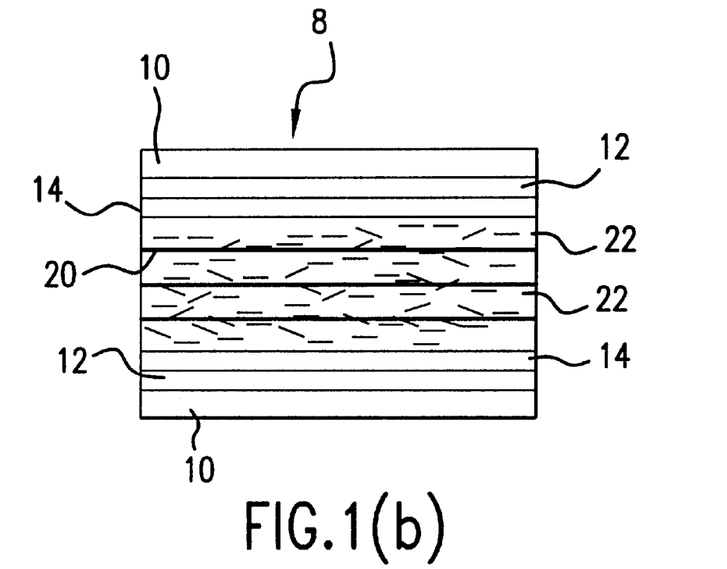
FIG. 1b is a schematic view illustrating the reflective display.

The device is then irradiated with interfering laser beams A and B, for example, that set up interference fringes within the device. The resultant structure is illustrated in FIG. 1b. Regions within the liquid crystal/polymer mixture 16 that experience the high intensity of the interference pattern of the lasers become polymer rich and form polymer sheets 20 and those regions where the intensity is low become void of polymer and form liquid crystal regions 22. As can be seen in FIG. 1b, the polymer sheets 20 and liquid crystal regions 22 form into a multilayer structure.

Figure 2A:
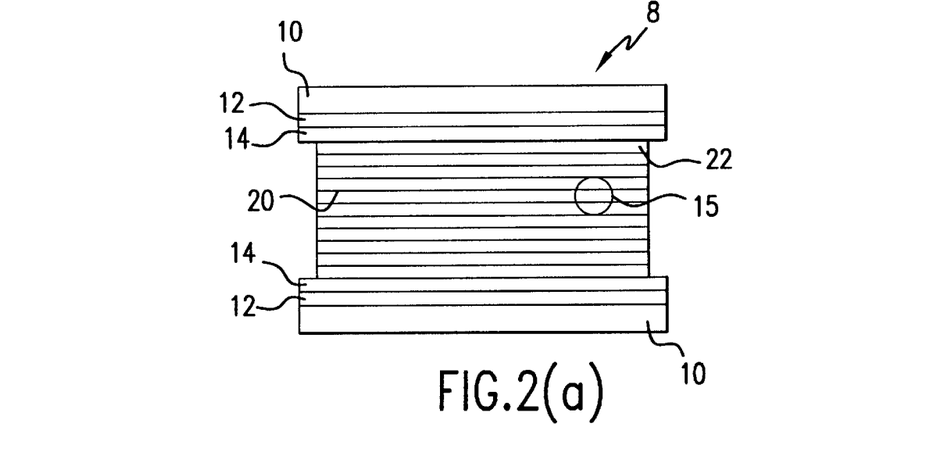
FIGS. 2a–2c illustrate the homogenous and homeotropic surface boundary conditions of the reflective display in the off-state.

The holographically formed reflective display 8 is illustrated in FIG. 2a in an off-state. The off-state occurs when no electric field is applied between the indium tin oxide layers 12. In the off-state, the display is transparent and all light is transmitted through the display because the molecules of the liquid crystal regions 22 are effectively index matched and aligned with the molecules forming the polymer sheets 20.

Figure 2B:
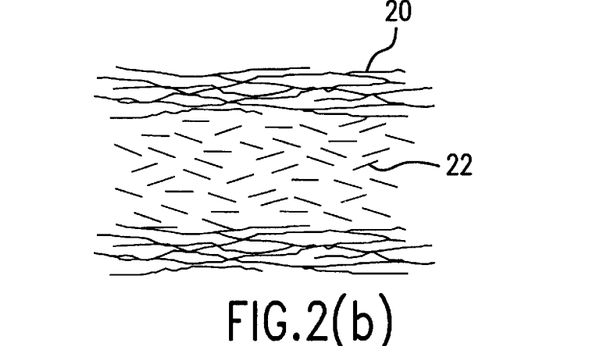
Figure 2C:
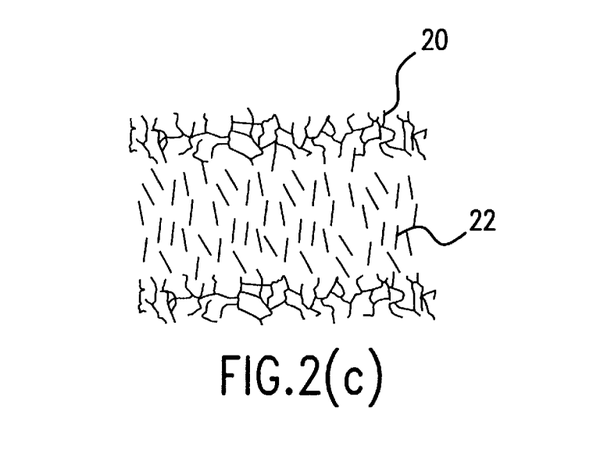
Figure 3A:
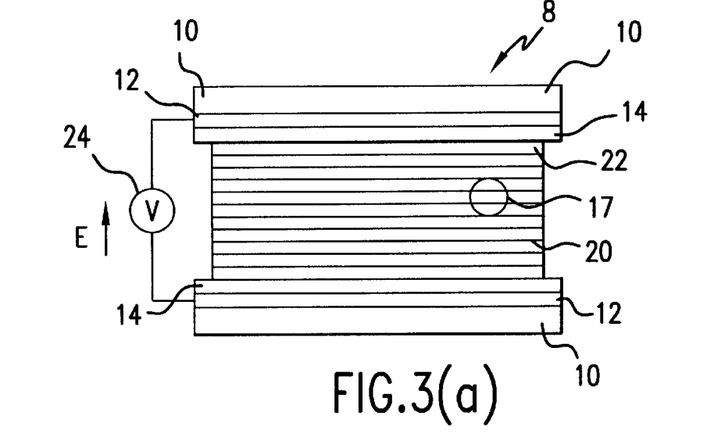
FIGS. 3a–3c illustrate the homogenous and homeotropic surface boundary conditions of the reflective display in the on-state.

The index matching in the off-state for homogeneous and homeotropic surface boundary conditions is illustrated in FIGS. 2b and 2c, which are enlarged views of the liquid crystal layer 22 and polymer sheets 20 within circles 15 and 17 of FIGS. 2a and 3a, respectively. In particular, FIG. 2b illustrates the homogeneous surface boundary conditions that are formed when the alignment layer 14 is a rubbed polymer layer. Such a rubbed polymer layer is well known to those of ordinary skill in the art and is formed by conventional rubbing techniques. The rubbed polymer layer causes the molecules within the polymer sheets 20 and within the liquid crystal regions 22 to form along the planar alignment direction of the nematic liquid crystal medium in a direction generally parallel to a surface of the substrate 10. As may be seen with reference to FIG. 2b, because the polymer molecules forming the polymer sheets 20 are anisotropic polymer molecules, the molecules are elongated and align in a single direction. Likewise, the molecules forming liquid crystal regions 22 are anisotropic and hence align in the same direction as the molecules forming the polymer sheets. This index matched alignment vastly reduces haze in the holographically formed reflective display 8 when it is viewed from various viewing angles. Conventional holographically formed reflective displays, in contrast, use isotropic polymers which are randomly aligned and thus create haze and opaqueness when viewed from various viewing angles.

Homeotropic surface boundary conditions for the reflective display 8 are illustrated in FIG. 2c, which is an enlarged view of the circle 15 shown in FIG. 2a. The homeotropic surface boundary conditions are created when the alignment layer 14 includes perpendicular alignment. One example is a silane surfactant layer. This causes the anisotropic polymer within the polymer sheets 20 to align substantially perpendicular to a surface of the substrates 10 as illustrated in FIG. 2C. Likewise, because the molecules within the liquid crystal region 22 are anisotropic, they align in the same direction as the anisotropic polymer molecules forming the polymer sheets 20. Again, use of the anisotropic polymer greatly reduces haze and opaqueness in the holographically formed reflective display 8 when viewed from various viewing angles.

FIG. 3a illustrates the holographically formed reflective display 8 in an on-state. In the on-state, a voltage from a voltage source 24 is applied between the indium tin oxide layers 12. This creates an electric field in the direction illustrated by arrow E and causes the display to be reflective of light of a desired wavelength. The desired wavelength of the reflected light may be selected during formation of the device by appropriately controlling the wavelengths of the interference fringes created by the laser or other holograhic means used during device formation.

Figure 3B:
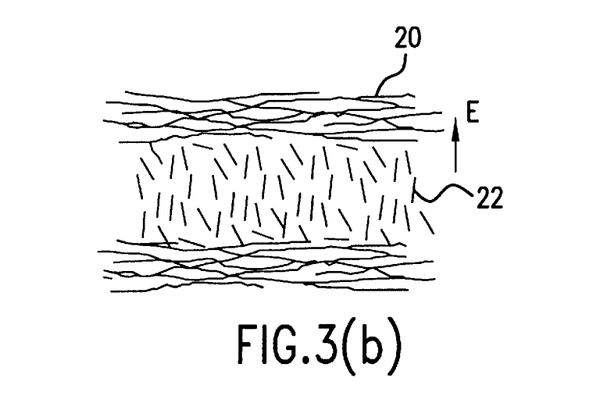

FIG. 3b is an enlarged view of the area shown within circle 17 in FIG. 3a for homogenous surface boundary conditions. Application of the electric field E between the indium tin oxide layers causes molecules with positive dielective anisotropy within the liquid crystal regions 22 to align parallel to the E direction, as illustrated in FIG. 3b. This causes light of a desired wavelength to be reflected while all other light is transmitted.

Figure 3C:
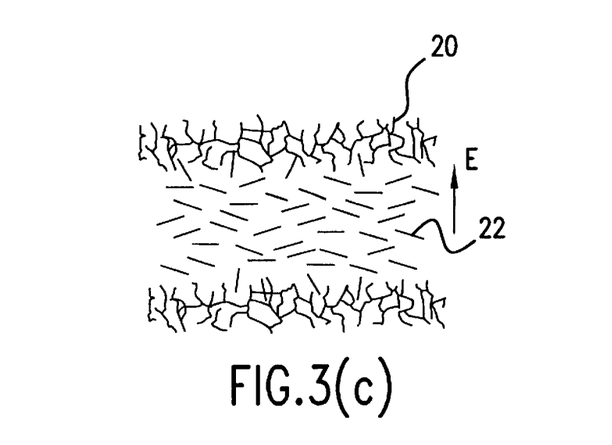

Homeotropic surface boundary conditions for the holographically formed reflective display 8 in the on-state are illustrated in FIG. 3c. For the case of homeotropic alignment, the liquid crystal material used is one with negative dielectric anisotropy. Here, application of the electric field E also causes the molecules with negative dielectric anisotropy within the liquid crystal region 22 to align perpendicular to the E field direction causing light of the desired wavelength to be reflected.

Figure 4:
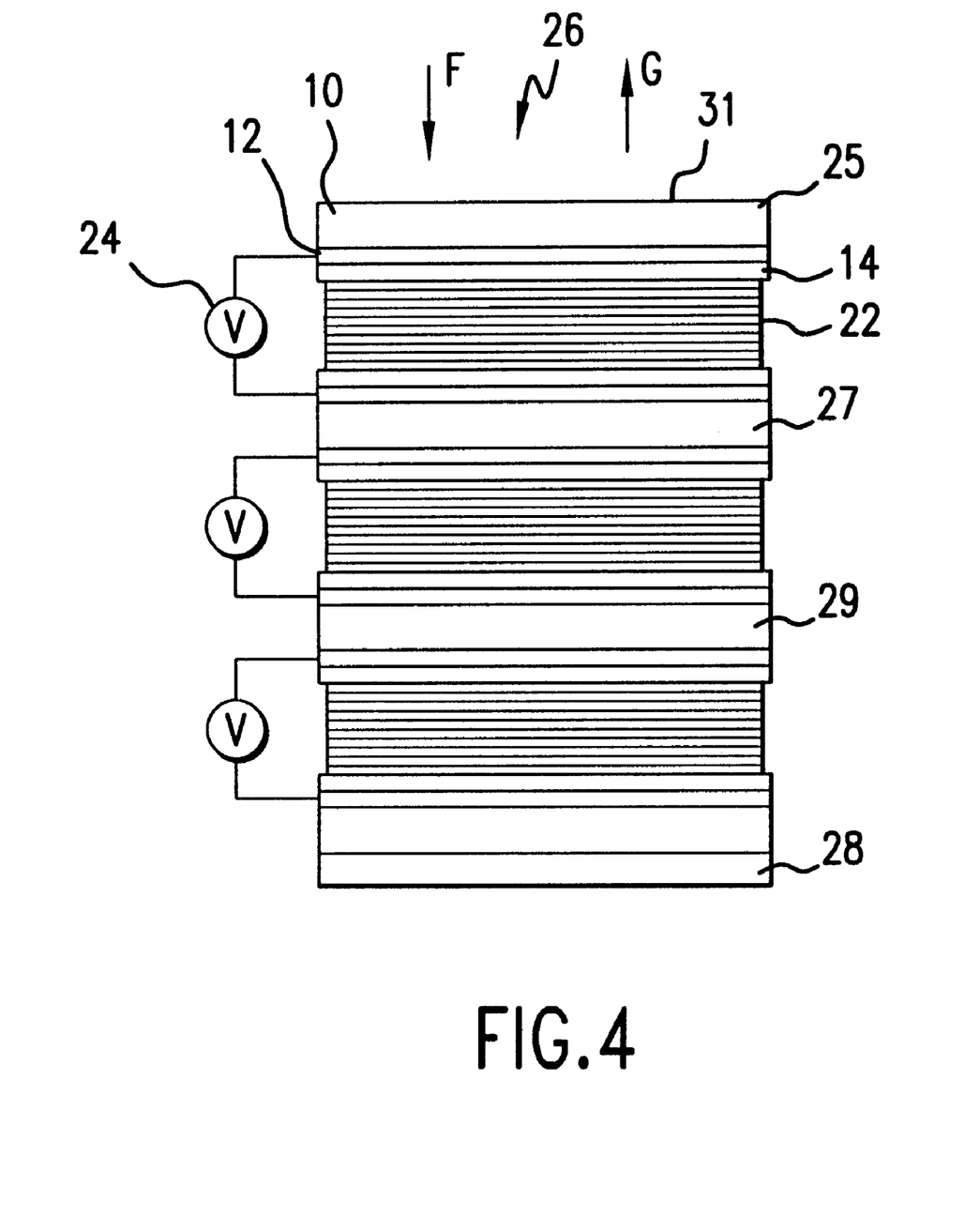
FIG. 4 illustrates a full-color reflective liquid crystal display.

A full-color liquid crystal display is illustrated in FIG. 4. For the case of homogeneous surface alignment, the liquid crystal material used is one with positive dielectic anisotropy. The full-color liquid crystal display 26 includes three holographically formed reflective displays 25, 27 and 29 (which are similar to the holographically formed reflective display 8) each being reflective of a different wavelength of light. The full-color liquid crystal display 26 includes black absorber 28 which is used to absorb non-reflective wavelengths and enhance display contrasts. As illustrated in FIG. 4, ambient light is exposed to the upper surface 31 of the full-color liquid crystal display 26 in the direction of arrow F. To form an image, the voltage sources 24 are each independently controlled to selectively reflect light from each of the holographically formed reflective displays 8, each reflecting light of a different wavelength. For example, the upper reflective display 25 in FIG. 4 may reflect light of 465 nm, the middle holographically formed reflective display 27 may reflect light of 545 nm and the lower holographically formed reflective display 29 may reflect light of 620 nm, to reflect light of blue, green and red wavelengths, respectively. By selectively activating the three holographic reflective display layers, a full-color image may be formed from incident broad-band illumination.

Figure 5:
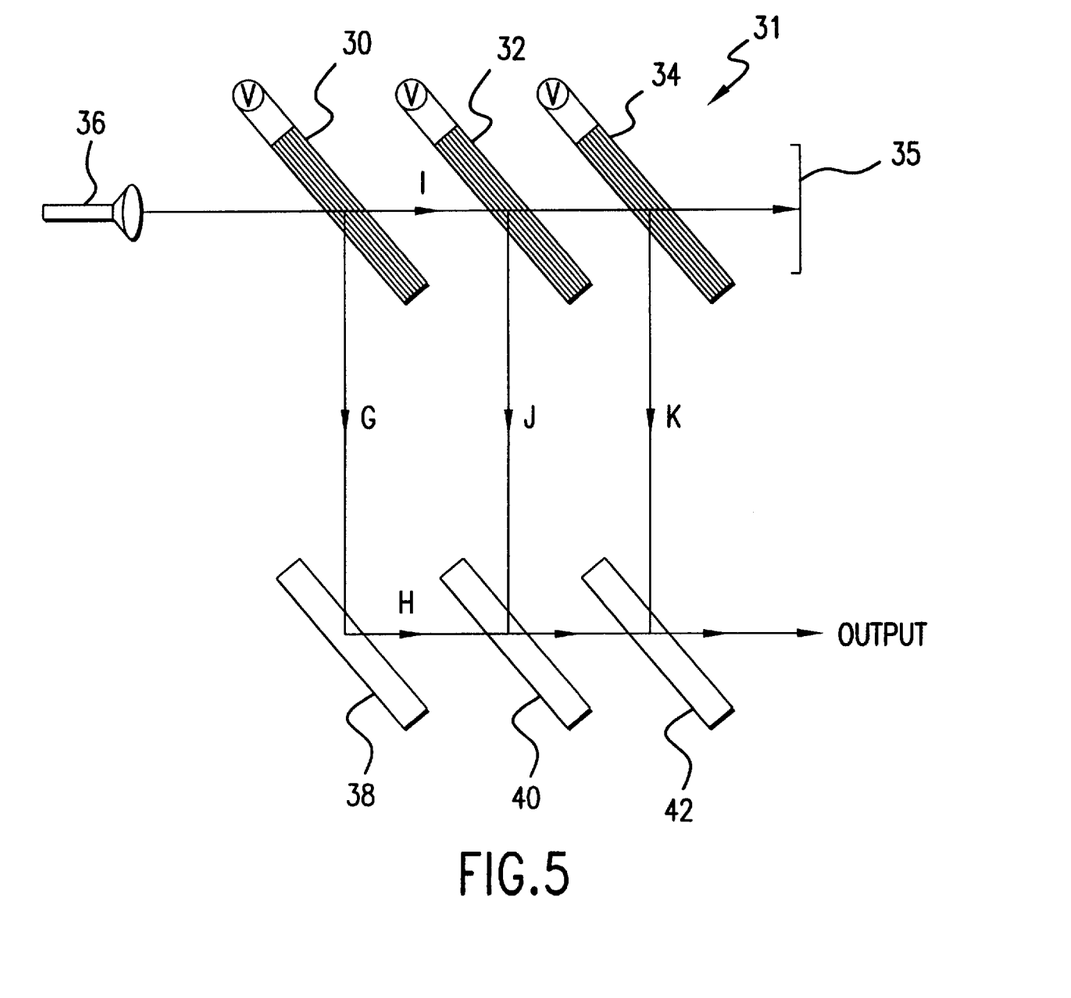
FIG. 5 illustrates a projection system which includes three reflective displays.

FIG. 5 illustrates a full-color projection system 31 which includes a first holographically formed reflective display 30, which may selectively reflect red light having an approximate wavelength of 620 nm, a second holographically formed reflective display 32, which may reflect green light of approximately 545 nm and a third holographically formed reflective display 34, which may reflect blue light of approximately 465 nm.

Light is input from a light source 36 and upon contacting the first holographically formed reflective display 30, red light having a wavelength of approximately 620 nm is reflected in the direction of arrow G onto mirror 38 and reflected towards an output in a direction of arrow H. Light which is not of the red wavelength of approximately 620 nm is transmitted by the first holographically formed reflective display 30 in the direction of arrow I to the second holographically formed reflective display 32. The second holographically formed reflective display 32 reflects light with a green wavelength of approximately 545 nm in the direction of arrow J onto a surface of first dichroic mirror 40. First dichroic wavelength mirror 40 transmits the red light reflected by mirror 38 and reflects the green light in a direction of arrow H. Light from the light source 36 which is not reflected by the second holographically formed reflective display 32 is transmitted to the third holographically formed reflective display 34, which reflects light of a blue wavelength of approximately 465 nm in the direction of arrow K onto a surface of second dichroic mirror 42.

Light which is not reflected by third holographically formed reflective display 34 is transmitted to light stop 35. Second dichroic mirror 42 reflects the blue wavelength light in the direction of arrow H and transmits the red and green light from mirror 38 and first dichroic mirror 40 to the output. In this way, an image may be formed and projected by the full-color projection system 31.

The above-noted reflective wavelengths for the first, second and third holographically formed reflective displays 30, 32 and 34 of the projection system 31 may be varied to the desired value by adjusting the wavelength of light that is reflected by each display to a desired value, as discussed above regarding the FIGS. 2a–3c embodiment.

Figure 6A:
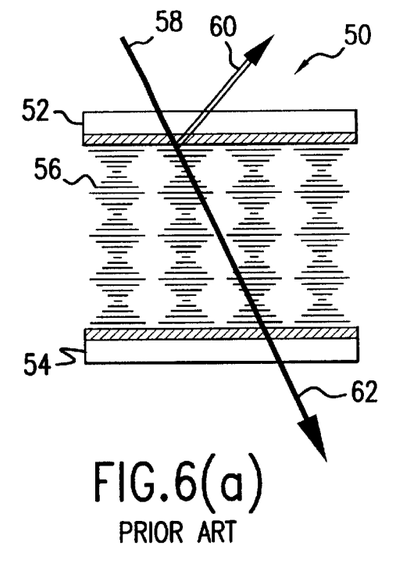
FIGS. 6a–6c illustrate a non-bistable reflective display.
Figure 6B:
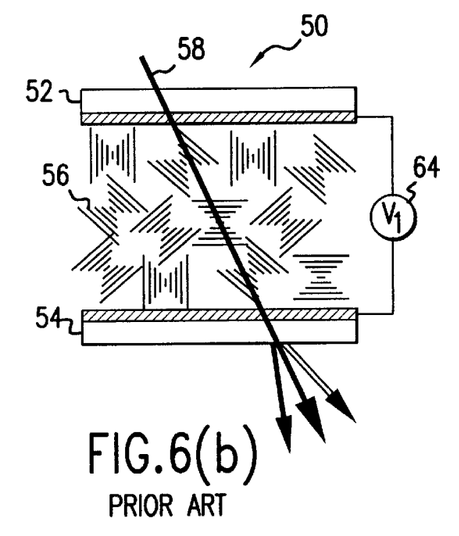
Figure 6C:
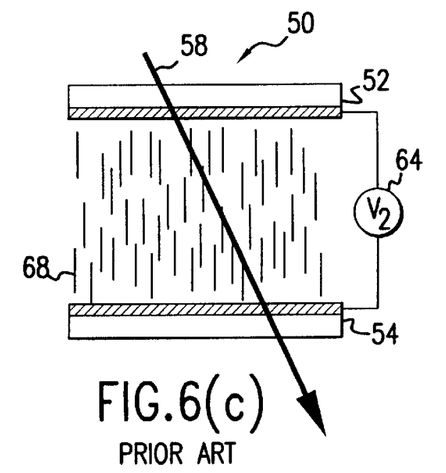

FIGS. 6a–6c illustrate a non-bistable reflective display 50. In FIG. 6a, the non-bistable reflective display 50 is illustrated in a reflecting planar state. Between the substrates 52 and 54 is disposed a cholesteric liquid crystal material which, when no voltage is applied, forms as molecules with helical axes 56. In this reflecting planar state, the liquid crystal molecules decompose incident light 58 into right- and left-hand components by reflecting a first component 60 and transmitting a second component 62.

The wavelength of the reflected component is governed by Bragg's law, $\lambda=nP$, where n is the average index of refraction and P is the pitch length (distance it takes the helix of the cholesteric liquid crystal to traverse through 360 degrees). The reflected wavelength $\lambda$ can be controlled by adjusting the composition of the cholesteric used in the liquid crystal mixture which modifies the pitch length P as is well known to those of ordinary skill in the art.

The non-bistable reflective display 50 is switched into the weakly scattering (focal conic) state when the voltage source 64 applies a voltage V1 to the substrates 52 and 54, creating an applied field, a torque is exerted on the liquid crystal, causing the helical axes 56 to become randomly oriented, as illustrated in FIG. 6b. This causes the non-bistable reflective display 50 to become nearly transparent where the incident light 66 is weakly scattered. If the applied voltage V1 is removed, the non-bistable reflective display 50 unfortunately reverts back to the planar reflective state.

If the voltage source 64 increases the applied voltage to a certain level V2 above V1, increasing the applied field, the non-bistable reflective display 50 changes to a homeotropic transparent state, as illustrated in FIG. 6c. In this homeotropic state, the helical structure of the liquid crystal material is untwisted, resulting in liquid crystal directors 68 aligned perpendicular to the substrates 52 and 54.

It is very desirable to have such a reflective display that will maintain the weakly scattering state after the applied voltage V1 is removed. Such a display is known as a bistable reflective display. Conventional cholesteric displays have only been able to achieve such a bistable display by using very rigid polymer networks within the liquid crystal or using various undesirable surfactants or polymers on the substrates.

Figure 7A:
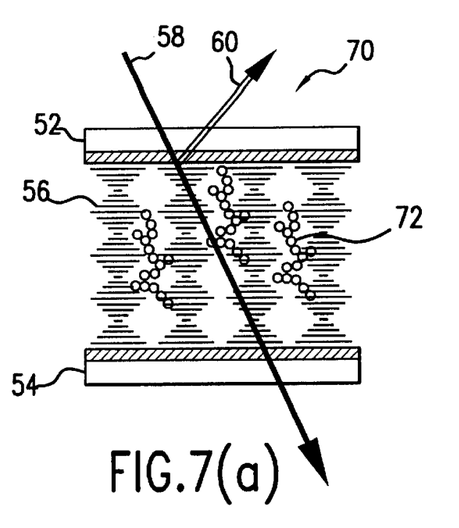
FIGS. 7a–7c illustrate a bistable display of the invention.

FIG. 7a illustrates a bistable reflective display 70 of the invention. The bistable reflective display 70 is identical to the non-bistable reflective display 50 except for the addition of the reconfigurable silica agglomerates 72. The silica agglomerates do not affect the bistable reflective display 70 in the reflective state as compared to the non-bistable reflective display 50.

Figure 7B:
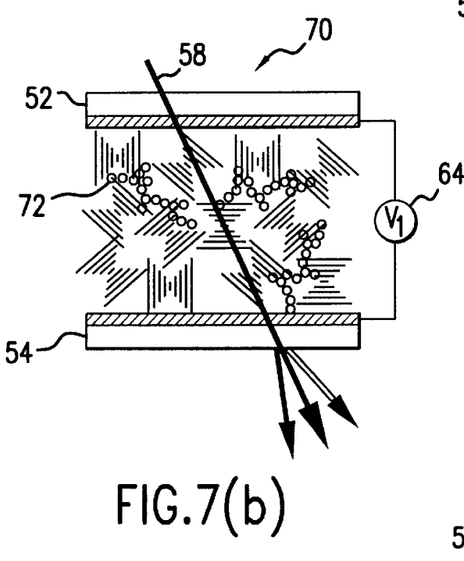

As illustrated in FIG. 7b, the bistable reflective display 70 achieves a weakly scattering or focal conic state when the voltage V1 is applied to the substrates. However, the reconfigurable silica agglomerates 72 added to the cholesteric liquid crystal create the bistability to maintain a stable weakly scattering state even if the voltage V1 is removed. The reconfigurable silica agglomerates 72 form hydrogen bonds which break when sufficient torque is applied by the electric field created when the voltage source 64 applies V1, allowing the bistable reflective display to change from the reflective state of FIG. 7a to the weakly scattering state of FIG. 7b. After this transition, the reconfigurable silica agglomerates 72 reform the hydrogen bonds, allowing the bistable reflective display 70 to maintain a stable weakly scattering state even when the voltage V1 is removed.

Figure 7C:
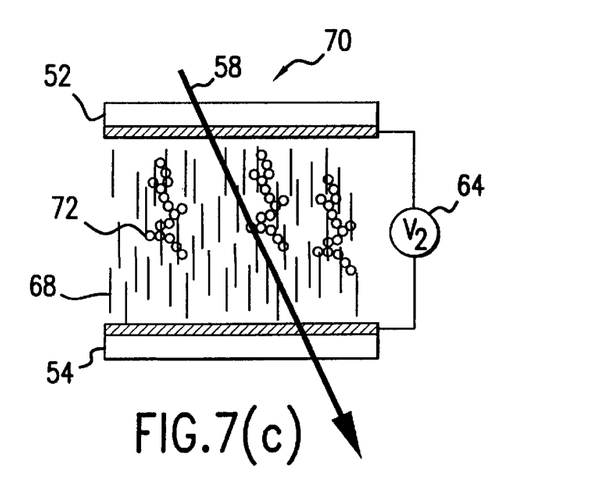

As illustrated in FIG. 7c, the bistable reflective display 70 transitions to the transparent state when the voltage source 64 applies a voltage V2, which is greater than V1. The increased voltage V2 has a value great enough to break the hydrogen bonds and cause the liquid crystal molecules to untwist, resulting in liquid crystal directors 68 aligned perpendicular to the substrates 52 and 54.

The reconfigurable silica agglomerates 72 are formed from silica particles mixed in the cholesteric liquid crystal. The concentration of the silica particles determines the amount of torque required to break the hydrogen bonds when transitioning from one state to another. The concentration is selected to have a value so as to maintain the weakly scattering state when the voltage V1 is removed, but not so high as to prevent transition from the transparent state to the reflective state when the voltage V2 is removed. It has been found by the inventor that an approximately 0.5–1.0 weight percent of silica particles to liquid crystal material produces this result. The silica particles may be Aerosil, available from Degussa AG of Frankfurt, Germany.

The bistable reflective display 70 produces reflected wavelengths of light in the reflective state illustrated in FIG. 7a that is controlled by adjusting the composition of the cholesteric and/or cholesteric dopant used in the liquid crystal mixture which modifies the pitch length P as is well known to those of ordinary skill in the art. In addition, a full color bistable reflective display may be produced by stacking three or more bistable reflective displays 70, each bistable reflective display being reflective of a different wavelength of light, in a manner similar to the full color liquid crystal display of FIG. 4.

The above invention may also be used with devices that would reflect wavelengths outside visible wavelegths. For example, the invention may also be used with devices that reflect UV or infra-red wavelengths.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A bistable reflective display, comprising:

first and second substrates;

a cholesteric liquid crystal material located between the first and second substrates;

silica agglomerates dispersed within the cholesteric liquid crystal material; and a voltage source that selectively applies a voltage to the first; and second substrates, wherein when the voltage has a first value, the bistable reflective display operates in a light scattering state and when the voltage has a second value, the bistable reflective display operates in a transparent state.

2. The bistable reflective display of claim 1, wherein the bistable reflective display maintains the light scattering state when the voltage source is operated to transition from applying the first value to applying zero volts.

3. The bistable reflective display of claim 1, wherein the bistable reflective display transitions from the transparent state to a reflective state when the voltage source is operated to remove the voltage having the second value.

4. The bistable reflective display of claim 1, wherein the silica agglomerates are formed from silica particles having an approximately 0.5–1.0 weight percentage of the silica particles to the cholesteric liquid crystal material.

5. The bistable reflective display of claim 1, wherein the bistable reflective display has a reflective state, the reflective state reflecting light of a desired wavelength and transmitting light not of the desired wavelength.

6. The bistable reflective display of claim 5, wherein the desired wavelength is selected by selecting a type of the cholesteric liquid crystal material.

7. The bistable display of claim 1, wherein the silica agglomerates are formed from silica particles and the silica particles have a weight percentage of the silica particles to the cholesteric liquid crystal material selected so as to maintain the light scattering state when the voltage source removes the voltage having the first value.

8. The bistable reflective display of claim 7, wherein the weight percentage of the silica particles to the cholesteric liquid crystal material is selected so as to allow the bistable reflective display to transition from the transparent state to a reflecting slate when the voltage source removes the voltage having the second value.

9. A method of forming a bistable reflective display, comprising:

forming first and second substrates;

forming a cholesteric liquid crystal material located between the first and second substrates;

forming silica agglomerates dispersed within the cholesteric liquid crystal material; and connecting a voltage source to the first and second substrates, the voltage source selectively applying a voltage, wherein when the voltage has a first value, the bistable reflective display operates in a light scattering state and when the voltage has a second value, the bistable reflective display operates in a transparent state.

10. The method of forming a bistable reflective display of claim 9, further comprising forming the bistable reflective display to maintain the light scattering state when the voltage source is operated to transition from applying the first value to applying zero volts.

11. The method of forming a bistable reflective display of claim 9, further comprising forming the bistable reflective display to transition from the transparent state to a reflective state when the voltage source is operated to remove the voltage having the second value.

12. The method of forming a paper-white reflective display of claim 9,further comprising forming the silica agglomerates from silica particles having an approximately 0.5–1.0 weight percentage of the silica particles to the cholesteric liquid crystal material.

13. The method of forming a bistable reflective display of claim 9, further comprising forming the bistable reflective display to have a reflective state, the reflective state reflecting light of a desired wavelength and transmitting light not of the desired wavelength.

14. The method of forming a bistable reflective display of claim 13, further comprising selecting a type of the cholesteric liquid crystal material to select the desired wavelength.

15. The method of forming a bistable reflective display of claim 9, further comprising forming the silica agglomerates from silica particles, the silica particles having a weight percentage of the silica particles to the cholesteric liquid crystal material selected so as to maintain the light scattering state when the voltage source removes the voltage having the first value.

16. The method of forming a bistable reflective display of claim 15, further comprising selecting the weight percentage of the silica particles to the cholesteric liquid crystal material so as to allow the bistable reflective display to transition from the transparent state to a reflecting state when the voltage source removes the voltage having the second value.

* * * * *